No. 663,015. Patented Dec. 4, 1900.
T. A. EDISON.
ELECTRIC METER.
(Application filed Mar. 17, 1899.)
(No Model.)
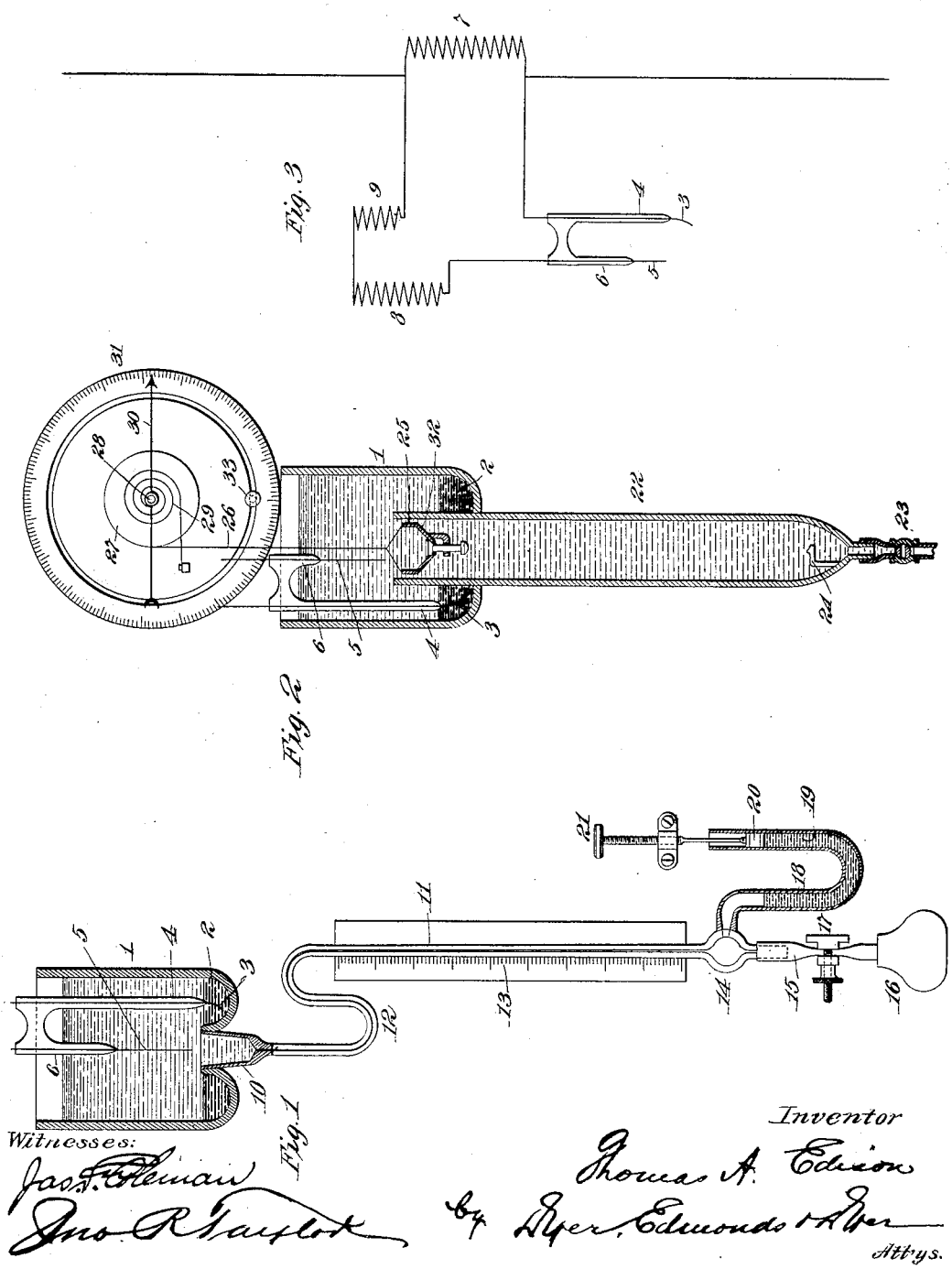

UNITED STATES PATENT OFFICE.

THOMAS A. EDISON, OF LLEWELLYN PARK, NEW JERSEY.

ELECTRIC METER.

SPECIFICATION forming part of Letters Patent No. 663,015, dated December 4, 1900.

Application filed March 17, 1899. Serial No. 709,446. (No model.)

*To all whom it may concern:*

Be it known that I, THOMAS A. EDISON, a citizen of the United States, residing at Llewellyn Park, in the county of Essex and State of New Jersey, have invented certain new and useful Improvements in Electric Meters, (Case No. 1,001,) of which the following is a specification.

My invention relates to improvements in electric meters; and the object of the invention is the production of a very accurate, simple, and reliable meter for measuring electric currents.

The invention is based on the fact that by subjecting a suitable soluble salt of mercury to electrolysis by a fraction of the current to be measured the metallic mercury set free by electrolysis will correspond exactly to the current, which can be determined by depositing the metallic mercury in the capillary bore of a glass tube, the amount being read off by means of an index, as with a thermometer, or by accumulating it in a receptacle suspended in a liquid and connected to an index-shaft, which will be caused to rotate against the tension of a volute spring as the weight of the deposited mercury increases, thereby moving an index over a scale, or the amount of metallic mercury deposited by electrolysis may be determined in any other way.

In order that my invention may be understood, attention is directed to the accompanying drawings, forming a part of this specification, and in which—

Figure 1 is a sectional view of one form of my improved meter, showing a capillary tube for effecting the measurement; Fig. 2, a similar view of a direct-reading device, showing a pointer and scale; and Fig. 3, a diagram of the circuit connections.

Referring to Fig. 1, 1 is a small electrolytic cell containing a solution of a soluble salt of mercury, preferably mercurous nitrate. The solution is preferably saturated to the point where the salt will not crystallize out when subjected to a temperature of 35° Fahrenheit.

2 is the mercury electrode in the bottom of the cell, and immersed entirely therein is a platinum wire 3, sealed in a glass tube 4. The mercurous nitrate in the solution and the mercury comprising the electrode 2 will be in as pure a condition as possible in order that changes in the resistance of the cell due to variations of load may be reduced. Preferably the mercury itself will be triple-distilled *in vacuo*. Evaporation of the solution in the cell or "creeping" of the salt may be prevented in any suitable way, such as by sealing the cell against the atmosphere or by covering the solution with a layer of paraffin or other non-miscible inorganic liquid.

5 is a very small platinum wire sealed in a glass tube 6, from which the tube 4 branches. I have found in practice that for twenty-light meters or less the diameter of the platinum electrode 5 should be about one one-thousandth of an inch and that its length should be about one inch. For larger meters the total surface of platinum should be increased nearly in proportion to the lamps to be measured. The two platinum electrodes 3 and 5 are connected in shunt around a low resistance 7, preferably German silver, as shown in Fig. 3, through a relatively high double resistance—for illustration, one of a thousand ohms. One section of this double resistance 8, comprising the bulk of the total resistance, is of the same material as the resistance 7, so that they will mutually compensate for changes of temperature. The other portion 9 of the resistance is made, preferably, of iron wire in as pure a state as possible, whereby the increase of resistance thereof due to any rise in temperature will exactly compensate for the diminution of the resistance of the solution. The resistance of the electrolytic cell which I employ for a twenty-light meter is about eight ohms. The resistance of the iron compensating coil or section 9 depends largely upon its purity and will be generally several times that of the cell. The larger resistance coil or section 8 is inserted in series with the electrodes 3 and 5 for the purpose of rendering any change in the resistance of the cell other than that due to temperature practically negligible. For instance, with a cell having a resistance of eight ohms under normal load its resistance under full load may drop to six ohms and on the minimum load may increase to fifteen ohms. Were there no resistance in the circuit this variation in the resistance of the cell would make the readings useless; but by inserting an enormously greater resistance in series with the electrodes—say one of a thousand ohms—variations in resistance of the cell from six to fifteen ohms, or a difference of nine ohms, would result in a variation of the current through the meter of less than one per cent. This feature of employing a relatively high resistance in series with an electrolytic cell I consider to be of very great importance, as by so doing the changes in resistance of the cell under variations in load are unobjectionable.

Located immediately below the electrode 5 is a cup 10, connected with a capillary tube 11, having a bend 12 therein. The bore 11 is preferably calibrated and coöperates with a scale 13, by which the weight of the contents of the tube may be determined. Connected with the lower end of the capillary tube 11 is a bulb 14, below which is any suitable form of draw-off device, such as a tube 15, leading to a check-bottle 16 and provided with a pinch-cock 17. Leading into the bulb 14 is the end of a pipe 18, having a mercury-piston 19 therein. A plunger 20 moves the mercury-piston in said pipe and is itself operated by a thumb-screw 21. Care should be taken in the manufacture of the receiving-cup 10 that the bottom thereof should merge into the capillary bore at a relatively slight angle, as shown.

The operation of the meter which I have described is as follows: Let it be assumed that the shunt 7 has a resistance of one-fourth of one per cent. of the total resistance with the lamps on of the consumption-circuit, the maximum number of lamps being in circuit for which the meter is to be used. Assuming the total resistance of the two resistance-coils 9 and 8 to be one thousand ohms, the meter will receive a current of one one-thousandth of that due to the electromotive force between the two ends of the shunt. The electrolytic action of the current in the shunt deposits mercury in very small globules, which accumulate on the fine platinum wire electrode 5 in great numbers, and when such globules reach a diameter of about one one-thousandth of an inch they drop off into the cup 10 and fall into the bend 12 of the capillary tube. These globules do not pass over the higher part of the bend, but collect and coalesce more or less together, but not perfectly. The accumulated column of mercury which forms in the bend 12 will, in fact, be very much broken up by the liquid between sections thereof which have coalesced. At the end of a month, or whenever a reading of the meter is to be effected, the column of mercury may extend up into the cup 10, forming a large globule. The thumb-screw 21 is now turned, and the mercury-piston 19 is forced slightly along the tube 18, which causes the liquid filling the capillary tube, globe 14, and pipe 18 above the mercury-piston to be moved, the liquid being forced up the capillary tube and forcing the mercury which accumulated in the bend 12 into the cup 10, forming a single homogeneous globule. Any liquid that had become entangled between coalesced sections of the mercury column would be forced up into the cup 10 around the sides of the single globule which is thus produced. If now rotation of the thumb-screw 21 is reversed, the liquid will be drawn out of the capillary tube and the globule in the cup 10 will be drawn down into the capillary tube as an unbroken column. The thumb-screw 21 is turned until the bottom of the column of mercury is at zero, and the length thereof may be then read off by the scale, indicating its weight or amount, which corresponds exactly to the current to be measured. The column of mercury in the capillary tube may remain until the next reading, or it can be removed at once to the check-bottle 16 by opening the pinch-cock 17. The latter is then closed, and the meter is ready for another reading. The amount of liquid removed by running the mercury into the check-bottle is very small, it being possible to produce a commercial meter having a relatively small electrolytic cell and wherein monthly readings for ten years would not result in the lowering of the liquid therein more than one-fourth of an inch. The check-bottle 16, which may be placed in a locked receptacle, can be used at any time to check a single reading or the aggregate readings of a meter either by removing the mercury therefrom and weighing it or by pouring it into a calibrated capillary tube coöperating with a scale, as explained. Care should be taken to have the capillary tube absolutely accurate, and I therefore prefer to calibrate it by weighing a globule of mercury of five hundred milligrams, introducing this in the capillary bore, marking the ends of the column "0" and "500," and dividing the scale into five hundred divisions, each division obviously representing one milligram.

In Fig. 2 the electrolytic cell 1 is provided with a tubular extension 22, having a suitable draw-off cock 23 at its bottom and a projection 24 located therein. Suspended beneath the platinum electrode 5 is a light preferably glass vessel 25, carried on a fine wire 26, secured to the periphery of a light disk 27, said disk being mounted on a shaft 28, to which is connected a fine hair-spring 29. The shaft 28 carries a pointer 30, coöperating with the scale 31. The spring 29 is adjusted to exactly counterbalance the cup 25 and to maintain the pointer 30 at zero. In operation as the minute globules of mercury accumulate on the platinum wire 5 and drop off into the cup 25 the spring 29 will be overbalanced, turning the pointer 30 relatively to the scale and indicating the amount of mercury which is thus deposited, whereby a direct reading will be effected. The cup 25 is provided with a valve 32 therein adapted to engage the projection 24 when a finger-piece 33 is moved by hand to rotate the pointer 30 and shaft 28, allowing the cup 25 to drop. When the valve has been thus released, permitting the accumulated mercury to flow out of the cup 25 into the bottom of the extension 22, the finger-piece 33 will be returned, whereupon the spring 29 will once more bring the pointer back to zero ready for the commencement of a further operation.

With both forms of meter most of the parts are formed, preferably, of glass, and when so made they will be dipped exteriorly a number of times in acetate of amyl collodion, being dried after each dipping. This forms a thin tough coat, preventing leakage in case of cracking.

Having now described my invention, what I claim as new, and desire to secure by Letters Patent, is as follows:

1. In an electric meter, the combination with an electrolytic cell having a metallic mercury electrode therein and a solution of a soluble mercury salt, of an electrode on which metallic mercury will be deposited by the electrolytic action of the current to be measured, a capillary tube connected to said cell for measuring the mercury deposited on said electrode, and a pump for forcing the mercury from and drawing it into said tube, substantially as set forth.

2. In an electric meter, the combination of an electrolytic cell, the electrodes therein, a receiving-cup in the bottom of said cell, a capillary tube connected to said cup, and a bend in said tube immediately below the cup, substantially as set forth.

3. In an electric meter, the combination of an electrolytic cell, the electrodes therein, a receiving-cup in the bottom of said cell, a capillary tube connected to said cup, a bulb at the bottom of said tube, and a pump connected to said bulb, substantially as set forth.

4. In an electric meter, the combination of an electrolytic cell, the electrodes therein, a receiving-cup in the bottom of said cell, a capillary tube connected to said cup, a bulb at the bottom of said tube, and a pump connected to said bulb, said pump having a mercury-piston, substantially as set forth.

5. In an electric meter, the combination of an electrolytic cell, the electrodes therein, a receiving-cup in the bottom of said cell, a capillary tube connected to said cup, a bulb at the bottom of said tube, a pump connected to said bulb, said pump having a mercury-piston, a plunger for operating said mercury-piston, and a thumb-screw for manipulating said plunger, substantially as set forth.

6. The combination with an electric meter having an electrolytic cell and connected in a shunt to the line, of a resistance in series with the cell, the resistance of the latter being enormously greater than that of the cell, whereby variations of the cell due to changes in load are rendered negligible, substantially as set forth.

7. The combination with an electric meter having an electrolytic cell arranged in shunt to the line, of a resistance enormously greater than that of the cell in series therewith, a section of said resistance being made of a metal the resistance of which changes inversely with the resistance of the cell by changes in temperature, substantially as set forth.

8. The combination with an electric meter employing an electrolytic cell connected in a shunt around a resistance in the line, of a resistance in series with the cell made of two sections, one corresponding to the resistance in the main line and the other compensating for variations in the resistance of the cell due to changes in temperature, substantially as set forth.

This specification signed and witnessed this 6th day of February, 1899.

THOMAS A. EDISON.

Witnesses:
J. F. RANDOLPH,
S. G. BEVIN.